US010026316B2

(12) United States Patent
Maier et al.

(10) Patent No.: US 10,026,316 B2
(45) Date of Patent: Jul. 17, 2018

(54) DETERMINING AN UNOCCUPIED STREET PARKING SPACE

(71) Applicant: Robert Bosch GmbH, Stuttgart (DE)

(72) Inventors: Manuel Maier, Esslingen (DE); Philipp Mayer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/728,122

(22) Filed: Oct. 9, 2017

(65) Prior Publication Data

US 2018/0130350 A1 May 10, 2018

(30) Foreign Application Priority Data

Nov. 4, 2016 (DE) ........................ 10 2016 221 682

(51) Int. Cl.
*B60Q 1/48* (2006.01)
*G08G 1/14* (2006.01)
*G08G 1/0965* (2006.01)

(52) U.S. Cl.
CPC ............. *G08G 1/14* (2013.01); *G08G 1/0965* (2013.01)

(58) Field of Classification Search
CPC .......... G08G 1/14; G08G 1/148; G08G 1/144; H04N 7/18; H04Q 7/20; G06Q 10/02
USPC ................ 340/932.2, 933, 518, 937, 915.12; 348/148, E07.085; 705/5
See application file for complete search history.

(56) References Cited

U.S. PATENT DOCUMENTS

| | | | | |
|---|---|---|---|---|
| 2003/0162536 A1* | 8/2003 | Panico | G08G 1/14 | 455/456.3 |
| 2007/0040701 A1* | 2/2007 | Browne | G08G 1/14 | 340/932.2 |
| 2013/0057686 A1* | 3/2013 | Genc | B60R 1/00 | 348/148 |

FOREIGN PATENT DOCUMENTS

DE 102004062021 A1 7/2006

* cited by examiner

*Primary Examiner* — Toan N Pham
(74) *Attorney, Agent, or Firm* — Norton Rose Fulbright US LLP; Gerard Messina

(57) ABSTRACT

A street parking space for a first motor vehicle is located within a predefined area. A method for determining an unoccupied street parking space includes steps of scanning environmental data of a second motor vehicle in the predefined area; determining an item of information regarding an unoccupied parking space in the area of the second motor vehicle on the basis of the environmental data; and reporting the item of information to a central instance. The central instance determines a demand for reports in the area on the basis of received information from a plurality of second motor vehicles, and suppresses further reports from a second motor vehicle as a function of the demand.

11 Claims, 4 Drawing Sheets

DETERMINING AN UNOCCUPIED STREET PARKING SPACE

CROSS REFERENCE

The present application claims the benefit under 35 U.S.C. § 119 of German Patent Application No. DE 102016221682.1 filed on Nov. 4, 2016, which is expressly incorporated herein by reference in its entirety.

FIELD

The present invention relates to a technology for determining an unoccupied parking space. More specifically, the present invention relates to the determination of the street parking space on the basis of reports from other road users.

BACKGROUND INFORMATION

One or more street parking space(s) is/are located along a street. Parking a motor vehicle in one of the street parking places is normally available to everyone as long as the street parking space is large enough for the motor vehicle. The parking may be free of charge or be subject to a fee, which is usually time-dependent.

Finding a free street parking space may be quite a challenge for a motor vehicle in search of parking. An unsuccessful parking attempt, e.g., because the street parking space turns out to be too small for the motor vehicle, may obstruct the flow of traffic.

German Patent Application No. DE 10 2004 062 021 A1 describes having the position and dimensions of an unoccupied street parking space be determined by another road user while passing the street parking space, and transmitting the data collected in this manner to a central instance. The central instance can then determine an appropriate street parking space for a motor vehicle in search of a parking space.

However, redundant information may arise in the central instance by permanent reports in connection with parking spaces from road users. One of the objects of the present invention is to provide a more optimal technology for the reporting of parking spaces. The present invention may achieve this objective. Preferred specific embodiments are described herein.

SUMMARY

In accordance with the present invention, a street parking space for a first motor vehicle is located within a predefined area. A method for determining an unoccupied street parking space includes steps of scanning environmental data from a second motor vehicle in the predefined area; determining an item of information regarding an unoccupied street parking space in the area of the second motor vehicle on the basis of the environmental data; and reporting the item of information to a central instance. The central instance determines a demand for reports in the area on the basis of received information from a plurality of second motor vehicles, and prevents further reports from a second motor vehicle as a function of the demand.

If the demand for reports on the part of the central instance has been satisfied, a transmission of additional, possibly redundant information is able to be prevented. A bandwidth of a transmission medium, e.g., a radio network, between the second motor vehicle and the central instance may thereby be utilized in a more optimal manner. More specifically, another service that also uses the medium is able to be given a greater share of the bandwidth. In addition to suppressing the reporting of the information, its determination on the part of the second motor vehicle may also be prevented. This makes it possible to reduce the loading of a processing device on board the second motor vehicle. In addition, the scanning of the environmental data is able to be reduced or suspended, so that stress on the environment, e.g., by electromagnetic waves or ultrasonic vibrations, may be lowered.

On the other hand, if there is a high demand for reports at the central instance, fewer or even no reports by second motor vehicles are able to be suppressed. In a first phase, for example, during which no findings about street parking spaces are available yet, a basic demand for reports is able to be provided more rapidly by accepting all reports. In a subsequent, second phase, changes in the stored data are able to be tracked correctly using a reduced number of reports, so that the reports from at least a few second motor vehicles may be suppressed without overly jeopardizing the accuracy of unoccupied parking spaces able to be determined on the basis of the received reports.

The central instance is able to suppress reports from a subset of second motor vehicles in the area as a function of the demand, and continue to accept reports from a residual set of motor vehicles. The cardinality of the subset is able to be selected as a function of a demand for reports or as a function of the cardinality or composition of the totality of second motor vehicles. This makes it possible for the control instance to control any number of intermediate stages between many and few received reports per time unit.

In one preferred specific embodiment, the central instance transmits an individual signal to second motor vehicles of the subset in order to suppress further reports. In other words, in one preferred specific embodiment a second motor vehicle is able to be addressed individually in order to send a signal to said motor vehicle for suppressing its reports. The signal is preferably transmitted using the same medium as for the report from the second motor vehicle. Here, a wireless transmission, for instance according to a known standard such as WLAN, Bluetooth, 3G, UMTS, LTE, etc. is provided, in particular. In another specific embodiment, a general signal may be output also to a multitude of second motor vehicles. Each motor vehicle receiving this signal is able to suppress additional reports. A corresponding release signal, in general or in individual form, may also be provided (see below).

The central instance is able to determine the demand on the basis of a temporal and/or local distribution of reports from second motor vehicles. For example, if reports regarding a point of the area are received less frequently than predefined, then the demand may be higher than the available information quantity. In this case, previously suppressed reports from second motor vehicles may be enabled again. If in another example, reports from a lesser number of second motor vehicles than predefined are received, then the demand for reports may likewise be greater than the available information quantity. Through the dynamic determination of the demand as a function of a temporal or spatial distribution of reports, a continual or uninterrupted collection of information is able to be controlled in a more optimal manner.

The central instance is able to determine the subset in such a way that the number of second motor vehicles of the residual set does not drop below a predefined value. In other words, a predefined number of second motor vehicles may be allocated to the area, and the central instance is able to suppress the reports from second motor vehicles in a selective manner in such a way that the predefined number will not be undershot. At the same time, the predetermined number is preferably observed as precisely as possible in order to use a minimum of bandwidth for reports.

The central instance may determine the subset in such a way that a scanning frequency of a point within the area satisfies a predefined minimum frequency. Put another way, the scanning frequency of a point of the area may be predefined. The point may be indicated or selected in specific terms. However, the point may also represent a plurality of points. In particular, an average scanning frequency of a random point or of all points within the area may be indicated. The central instance is able to selectively suppress reports from second motor vehicles that are unable to contribute, or contribute too little, to the current information, for instance on account of their location. For example, if two second motor vehicles are trailing each other, then the reports from the trailing motor vehicle may already be known to the central instance from the reception from the vehicle driving ahead. The reports from the trailing second motor vehicles may be suppressed in this case with hardly any loss in information.

On the basis of reports from second motor vehicles of the residual subset, the central instance is able to determine a rate of change in the occupancy status of parking spaces in the area and end the suppression as a function of the rate of change. If the central instance determines that parking spaces in the predefined area are occupied or released more frequently on average than predefined, then previously suppressed reports from second motor vehicles may be enabled again in order to better represent the higher rate of change in the parking space situation by an increased number of reports.

The central instance may generally enable the reporting from second motor vehicles again as a function of the demand. For example, if it is determined that the available information is no longer up-to-date, then new information may rapidly be collected in a dynamic manner.

A reporting device on board a motor vehicle includes a scanning device for scanning an environment of the motor vehicle; a processing device for determining an item of information regarding an unoccupied street parking space for a motor vehicle on the basis of the scanning; a transmission device for reporting an item of information regarding the street parking space to a central instance; and a receiving device for receiving a signal from the central instance, the processing device being configured to suppress a further report as a function of the received signal.

This may make the reporting device suitable for participating in the afore-described method. A bandwidth used by the reporting device for the transmission of reports to the central device may be reduced.

A determination device for an unoccupied street parking space for a first motor vehicle in a predefined area includes a receiving device for receiving an item of information regarding an unoccupied street parking space from a motor vehicle in the predefined area; and a processing device for determining the unoccupied street parking space on the basis of the item of information. The processing device is designed to determine a demand for reports in the area on the basis of received information from a plurality of motor vehicles, and to suppress additional reports from the motor vehicle as a function of the demand.

In particular, the determination device may assume the role of the central device in the method described above.

A system includes the afore-described determination device as well as at least one motor vehicle equipped with the reporting device described above. The system may be used for executing the afore-described method. Different parts of the method are able to be executed on different components of the system. Thus, advantages and features that are described with regard to the method correspondingly also apply to the respective device or the system and vice versa.

BRIEF DESCRIPTION OF THE DRAWINGS

The present invention will now be described in greater detail with reference to the figures.

DETAILED DESCRIPTION OF EXAMPLE EMBODIMENTS

Figure 1:
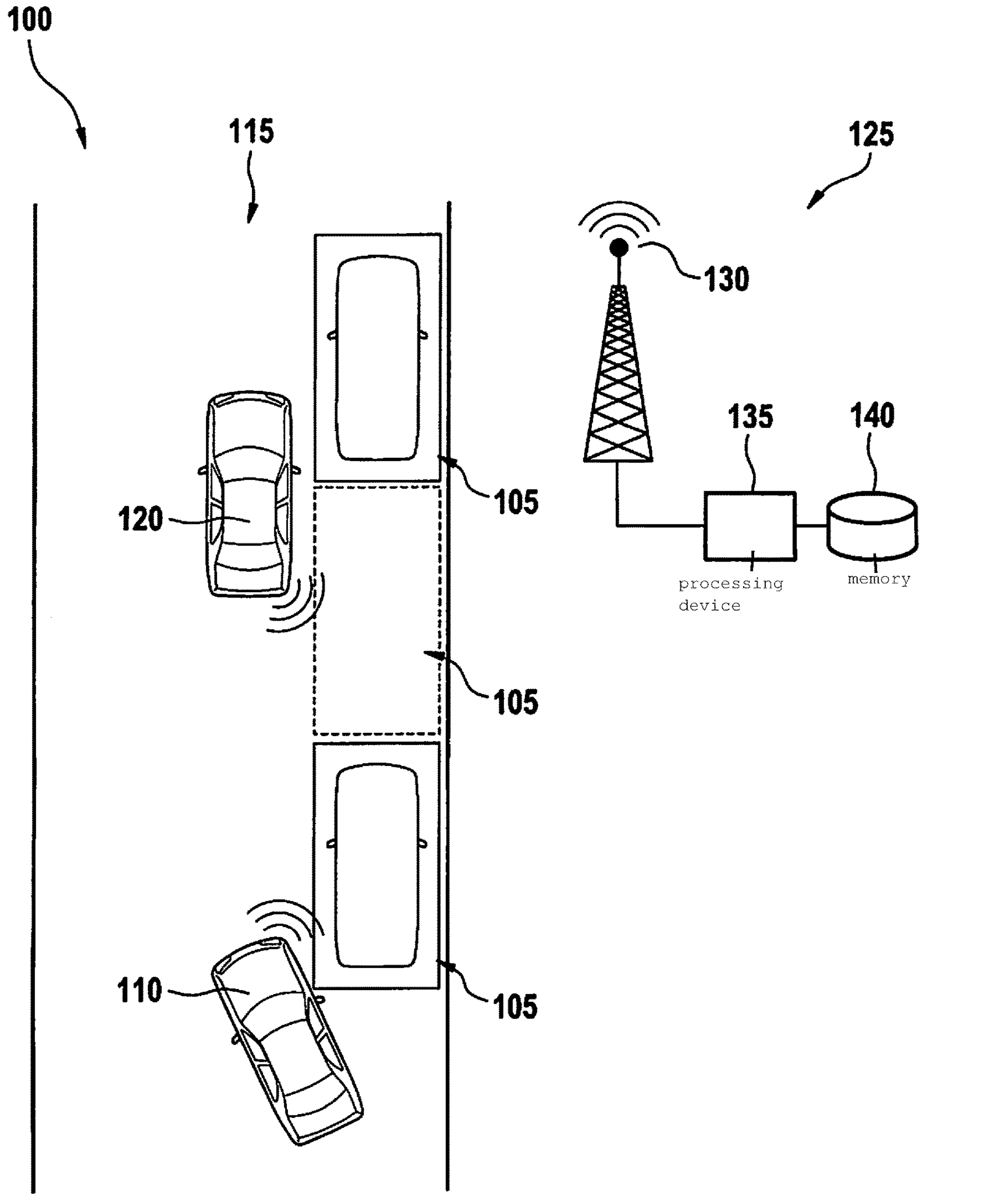
FIG. 1 shows a system having a central instance as well as motor vehicles.

FIG. 1 shows a system 100 for determining an unoccupied street parking space 105 for a first motor vehicle 110. Street parking space 105 is located within a predefined area 115, which includes a street in FIG. 1. However, in other specific embodiments, for example, it also includes a plurality of interconnected streets, a city section or a traffic complex. Area 115 may also be defined according to a geometric figure, e.g., as a web having predefined dimensions, or as a circle or rectangle.

A second motor vehicle 120 is driving on a street in area 115 and is designed to scan its own environment using a sensor in order to scan an unoccupied street parking space 105. Data that point to a street parking space 105 may include especially a location, geometrical dimensions of street parking space 105, or a scanning instant. In one specific embodiment, the location of street parking space 105 is already known prior to the scanning, e.g., when street parking space 105 is identified by size and position, for instance by way of markings. A parking direction of street parking space 105 may in particular lie at an angle or perpendicular to the extension of the adjoining street. Especially when the location of street parking space 105 is known, the scanning may include its occupied status. If a motor vehicle 110 or some other object occupies street parking space 105, then it is considered “occupied”, and “free” in all other cases. Further details in connection with the scanning of street parking space 105 will be described below with reference to FIG. 2.

Based on the scanning, an item of information with regard to street parking space 105 is determined and transmitted to a central instance 125. The transmission is preferably carried out in a wireless manner, e.g., via a mobile radio network. In one specific embodiment, the scanned data are processed further by the second motor vehicle, and in another specific embodiment, the unprocessed data are reported or transmitted to central instance 125.

Central instance 125 may be realized in the form of a server, a cloud or as a virtualized service, for example. The central instance preferably includes a wireless interface 130, preferably also a processing device and, optionally, a memory 140. Central instance 125 is preferably set up to receive reports from a multitude of second motor vehicles 120 in area 115 and to determine unoccupied street parking spaces 105 in area 115 on the basis of the reports. In this context, it is possible to combine reports, in particular with regard to their allocated locations (or positions), and/or their scanning instants. In addition, information is able to be interpolated or extrapolated on the basis of received reports, for which a statistical method may be used, in particular.

If central instance 125 has received sufficient data in connection with unoccupied parking spaces 105, then it may be used by first motor vehicle 110, for instance in order to determine an unoccupied parking space 105 for parking first motor vehicle 110. For this purpose, in particular an unoccupied parking space 105 that lies as close as possible to the position of first motor vehicle 110 may be selected. It is especially preferred that determined parking space 115 lies in area 115 in which first motor vehicle 100 is located as well.

In order to set up an initial database for central instance 125, as many reports as possible are collected by or received from second motor vehicles 120. However, in a subsequent phase it may be sufficient for central instance 125 to collect fewer reports than second motor vehicles 120 are able to supply. Therefore, it is provided in accordance with the present invention that central instance 125 suppresses the reports from second motor vehicles 120 as a function of a demand for reports. For this purpose, central instance 125 is able to emit a signal, in particular in a wireless manner, to one, multiple, or all second motor vehicles 120 in area 115 in order to induce second motor vehicles 120 to suppress, prevent or suspend additional reports. To allow for an increase in the number of reports at a later point in time, the signal may include a time after which the reporting prohibition is canceled again, or some other signal may be transmitted that cancels or ends the reporting prohibition.

Figure 2:
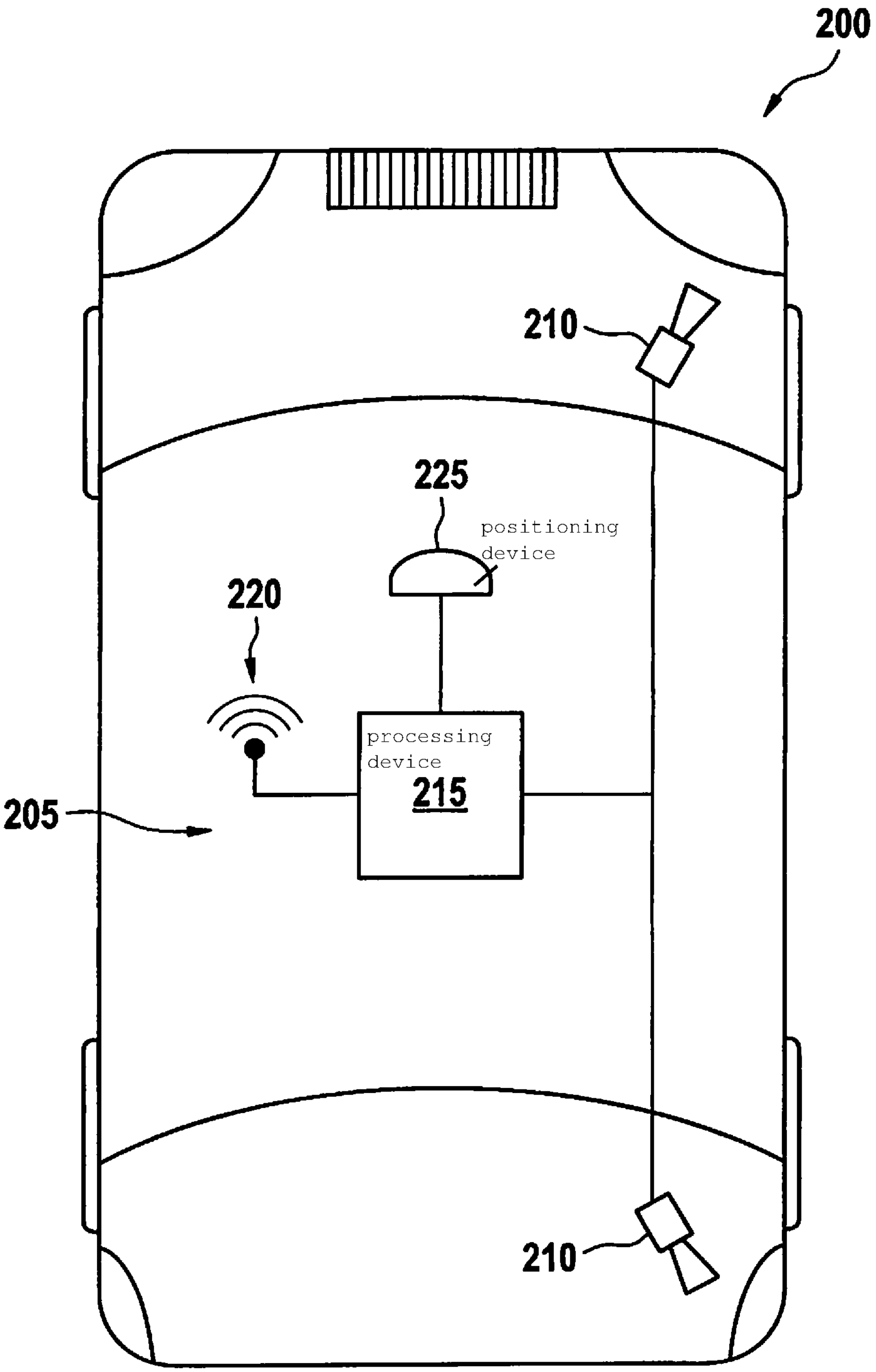
FIG. 2 shows a motor vehicle having a device for reporting an unoccupied street parking space.

FIG. 2 shows a motor vehicle 200 that may be used especially as second motor vehicle 120 in system 100 from FIG. 1. A use as first motor vehicle 110 is naturally possible as well. Mounted on board motor vehicle 200 is a reporting device 205 that includes at least one scanning device 210 for scanning an environment of motor vehicle 200, possibly on the basis of radar, lidar, or ultrasound, or by optical scanning. Also included is a processing device 215, and a preferably wireless communications device 220, which is preferably able to be used both as a transmission device and receiving device for the communication with central instance 125. In addition, a positioning device 225 for determining a position of motor vehicle 200 prior to, during or following the scanning of a street parking space 105 is preferably provided. Moreover, it is preferred that a time basis (not shown) is provided for determining a scanning instant.

Reporting device 205 is set up to determine an item of information with regard to a scanned street parking space 105 on the basis of a scanning operation of the environment of motor vehicle 200. In this case, only unoccupied street parking spaces 105 may be determined, or it is possible, especially if street parking spaces 105 are known or fixedly assigned, to determine their occupancy status. The item of information will then be reported to central instance 125, preferably directly.

In addition, reporting device 205 is designed to receive and evaluate a signal from central instance 125 with the aid of communications device 220. The signal may specifically indicate that the further reporting of information regarding street parking spaces 105 is not desired. In such a case, reporting device 205 then suppresses the further transmission of reports and preferably also the further scanning of the environment of motor vehicle 200.

Figure 3:
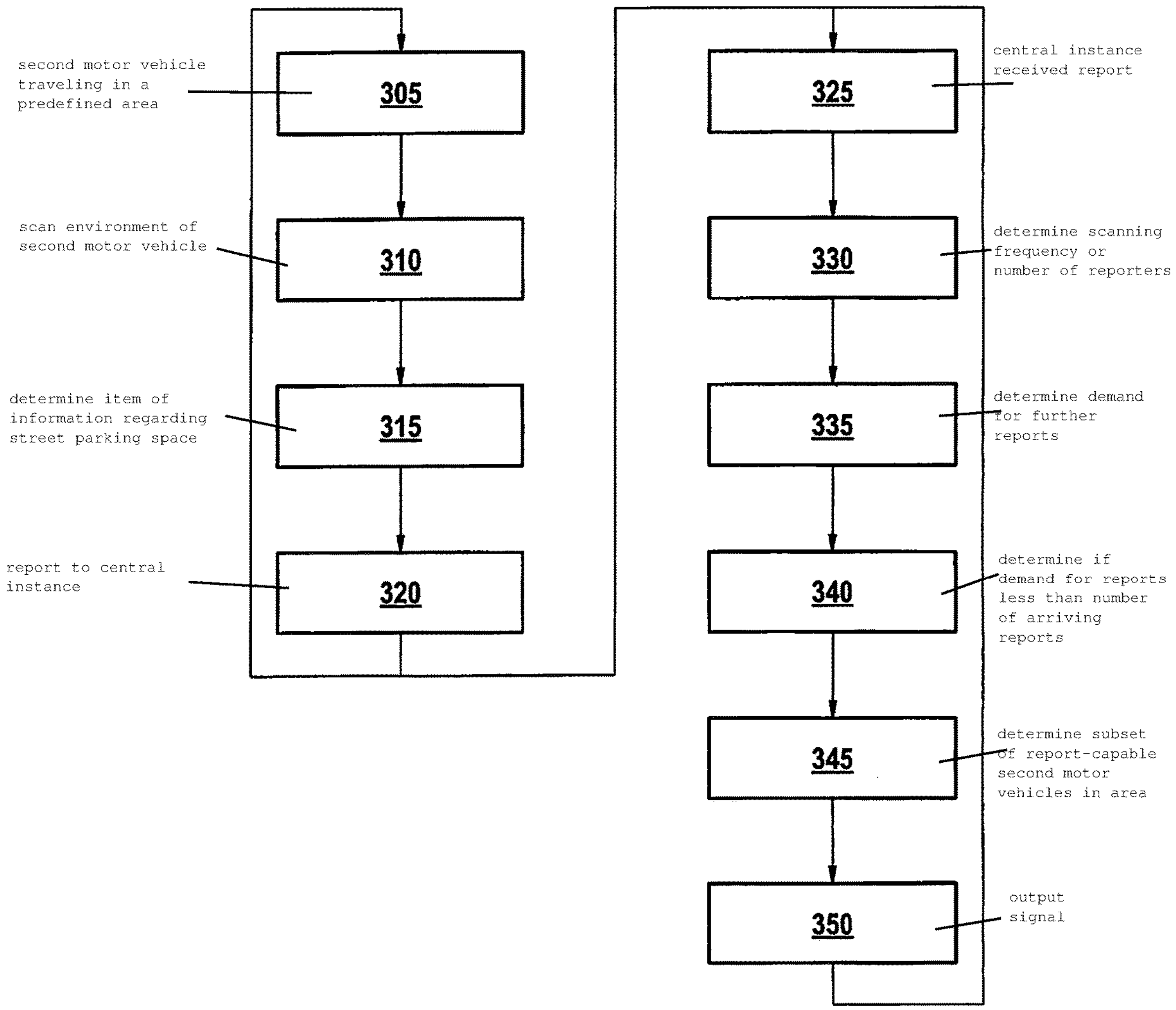
FIG. 3 shows a flow diagram of a method for determining unoccupied street parking spaces in a predefined area.

FIG. 3 shows a flow diagram of a method 300 for determining unoccupied street parking spaces 105 in a predefined area 115. Steps shown on the left are preferably carried out by a second motor vehicle 120, while steps shown on the right are preferably executed by central instance 125.

In a first step 305, a second motor vehicle 120 is traveling in predefined area 115. In a step 310, an environment of second motor vehicle 120 is scanned. In particular a road edge at which a street parking space 105 may be located is able to be scanned, actively or passively, with the aid of a scanning device 210 while second motor vehicle 120 is driving along the road. Based on the scanning, an item of information regarding street parking space 105 is determined in a step 315 and reported to central instance 125 in a step 320. This part of method 300 may subsequently be run through again. It should be noted that this part of method 300 is usually executed in parallel by a plurality of second motor vehicles 120 in area 115.

In a step 325, central instance 125 receives a report from a second motor vehicle or its reporting device 205, and a street parking space 105 in predefined area 115 is determined on the basis of the report. In one specific embodiment, only information about an unoccupied parking space 105 is accepted, and in another specific embodiment, information about street parking space 105 and its occupancy status are able to be accepted.

In a step 330, a scanning frequency (reports per time unit) or a number of reporters (second motor vehicles) in area 115 are able to be determined. Both characteristic variables may indicate the respective trustworthiness of the available information in connection with parking spaces 105 in area 115. One or both characteristic variable(s) is/are preferably used in a step 335 for determining a demand for further reports. The demand may be determined in abstract terms based on a specially defined scale, or in specific terms, e.g., as a desired scanning frequency or number of reporters. The demand may in particular be determined as a function of a rate of change of the occupancy status of street parking spaces 105. If frequent changes occur, then the demand may be greater, and if only infrequent changes can be observed, then the demand may be lower. In addition, the breadth of the information basis may be factored into the determination of the demand. If only a low number of reports or incomplete or old reports are available, then the demand may be greater.

If it is determined in a step 340 that the demand for reports is less than the number of arriving reports, then individual or all second motor vehicles 120 may be temporarily excluded from reporting, as described in greater detail in the previous text. In the other case, i.e. if the demand is greater than the number of arriving reports, second motor vehicles 120 or their reporting devices 205 may be actuated in order to generate or transmit reports more frequently again. This determination will then preferably be carried out with reference to a predefined area 115, which will be described in greater detail in the further text with reference to FIG. 4.

In a step 345, a subset of the report-capable second motor vehicles 120 in area 115 is able to be determined. Report-capable second motor vehicles 120 include the particular second motor vehicles 120 that are traveling in predefined area 115 and are equipped with a reporting device 205. In a step 350, a signal may then be output to the subset or to all second motor vehicles 120 (or to their reporting devices). This part of method 300 may subsequently return to step 325 and be run through again.

Figure 4:
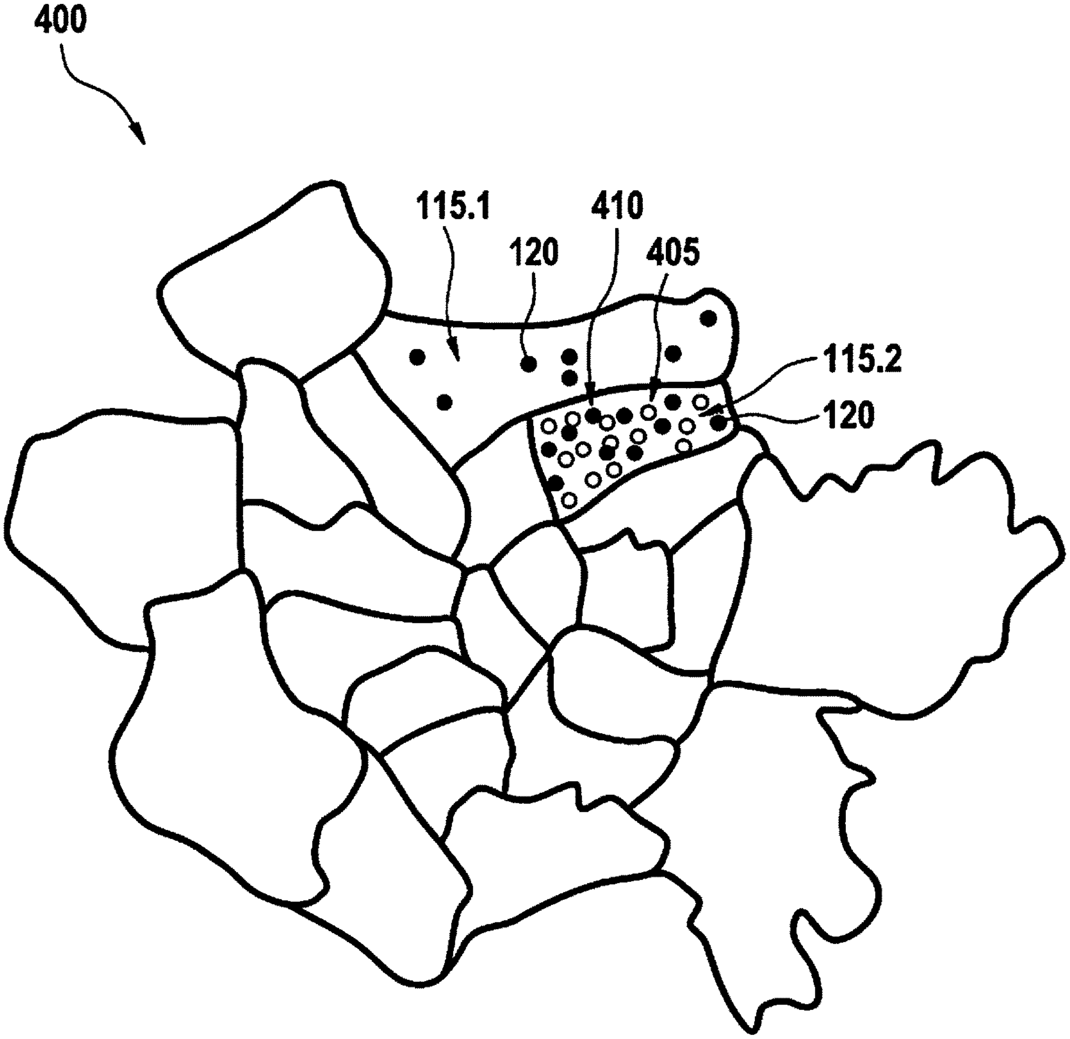
FIG. 4 shows a representation of different areas of an exemplary town.

FIG. 4 shows an exemplary illustration of different areas 115 of an exemplary town 400. Only a few second motor vehicles 120 are located in a first exemplary area 115.1, while more second motor vehicles 120 are present in a second exemplary area 115.2. The density of second motor vehicles 120 in second area 115.2 is higher than the density in first area 115.1.

In second area 115.2, a subset 405 having second motor vehicles 120 that are shown in white, and a residual set 410 having second motor vehicles 120 that are shown in black is formed from the totality of the (report-capable) second motor vehicles 120. Second motor vehicles of residual set 410 may be inhibited so that they do not output any further reports to central instance 125. This makes it possible to adapt the density of reporting second motor vehicles 102 in second area 115.2 to that in first area 115.1. By an appropriate generation of subset 405, second motor vehicles 120 of residual set 410 are able to be distributed in second area 115.2 in the most uniform manner possible.

What is claimed is:

1. A method for determining an unoccupied street parking space for a first motor vehicle, the street parking space being located within a predefined area, the method comprising:
- scanning environmental data of a second motor vehicle in the predefined area;
- determining an item of information regarding an unoccupied street parking space in an area of the second motor vehicle based on the environmental data; and reporting the item of information to a central instance; wherein:
- the central instance determines a demand for reports in the area on the basis of received information from a plurality of second motor vehicles; and
- suppresses further reports from the second motor vehicle as a function of the demand.

2. The method as recited in claim 1, wherein the central instance suppresses reports from a subset of the second motor vehicles in the area as a function of the demand, and continues to accept reports from a residual subset of the second motor vehicles.

3. The method as recited in claim 2, wherein the central instance transmits a signal respectively to the second motor vehicles of the subset in order to suppress further reports.

4. The method as recited in claim 2, wherein the central instance determines the subset in such a way that a number of the second motor vehicles of the residual subset does not drop below a predefined value.

5. The method as recited in claim 2, wherein the central instance determines the subset in such a way that a scanning frequency of a point within the area satisfies a predefined minimum frequency.

6. The method as recited in claim 1, wherein the central instance determines the demand based on at least one of: a temporal distribution of reports and a local distribution of reports, from the second motor vehicles.

7. The method as recited in claim 1, wherein the central instance determines a rate of change in the occupancy status of parking spaces in the area based on reports from the second motor vehicles of the residual subset and ends the suppression as a function of the rate of change.

8. The method as recited in claim 1, wherein the central instance enables the reports from the second motor vehicles again as a function of the demand.

9. A reporting device on board a motor vehicle, the reporting device comprising:
- a scanning device for scanning an environment of the motor vehicle;
- a processing device for determining an item of information regarding an unoccupied street parking space for the motor vehicle based on the scanning;
- a transmission device for reporting an item of information regarding the street parking space to a central instance; and
- a receiving device for receiving a signal from the central instance;
- wherein the processing device suppresses a further report as a function of the received signal.

10. A determination device for an unoccupied street parking space for a motor vehicle in a predefined area, the determination device comprising:
- a receiving device for receiving an item of information regarding an unoccupied street parking space from a motor vehicle in the predefined area; and
- a processing device for determining the unoccupied street parking space based on the item of information, the processing device being designed to determine a demand for reports in the area based on the received items of information from a plurality of motor vehicles, the processing device further being designed to suppress further reports from the motor vehicle as a function of the demand.

11. A system, comprising:
- a central instance including a determination device for an unoccupied street parking space for a motor vehicle in a predefined area, the determination device including a receiving device for receiving an item of information regarding an unoccupied street parking space from the motor vehicle in the predefined area, and a processing device for determining the unoccupied street parking space based on the item of information, the processing device being designed to determine a demand for reports in the area based on the received items of information from a plurality of motor vehicles, the processing device further being designed to suppress further reports from the motor vehicle as a function of the demand; and
- at least one motor vehicle equipped with a reporting device, the reporting device including a scanning device for scanning an environment of the motor vehicle, a processing device for determining the item of information regarding the unoccupied street parking space for the motor vehicle based on the scanning, a transmission device for reporting the item of information regarding the street parking space to the central instance, and a receiving device for receiving a signal from the central instance, wherein the processing device suppresses a further report as a function of the received signal.

* * * * *